United States Patent
Matsumoto et al.

(10) Patent No.: US 6,344,657 B1
(45) Date of Patent: Feb. 5, 2002

(54) STIMULABLE PHOSPHOR SHEET FOR DOUBLE-SIDE READING SYSTEM

(75) Inventors: Hiroshi Matsumoto; Hideki Suzuki, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/510,153

(22) Filed: Feb. 22, 2000

(30) Foreign Application Priority Data

Feb. 19, 1999 (JP) ............................................ 11-041072

(51) Int. Cl.⁷ ......................... G01N 27/04; G01N 23/04
(52) U.S. Cl. ...................................... 250/588; 250/581
(58) Field of Search ................................ 250/582, 583, 250/584, 587, 588, 581

(56) References Cited

U.S. PATENT DOCUMENTS

| | | | | |
|---|---|---|---|---|
| 4,851,679 A | * | 7/1989 | Tamura et al. | 250/588 |
| 5,065,021 A | * | 11/1991 | Arakawa | 250/588 |
| 6,259,113 B1 | * | 7/2001 | Funabashi | 250/588 |

* cited by examiner

*Primary Examiner*—Ricky Mack

(57) ABSTRACT

A stimulable phosphor sheet to be employed in a radiation image double-side reading system is preferably has the following condition: radiation energy image erasability on a front side surface onto which stimulating rays are to be applied being lower than that on a back side surface in such manner that a ratio of a difference of an erasing value to a lower erasing value determined on the front side surface or on the back side surface is less than 10%.

9 Claims, No Drawings

STIMULABLE PHOSPHOR SHEET FOR DOUBLE-SIDE READING SYSTEM

FIELD OF THE INVENTION

The present invention relates to a stimulable phosphor sheet employed in a process for radiation image recording and reproducing method including a double-side reading system.

BACKGROUND OF THE INVENTION

As a method replacing a conventional radiography, a radiation image recording and reproducing method utilizing a stimulable phosphor was proposed, and has been practically employed.

A representative radiation image recording and reproducing method comprises the steps of:

irradiating one surface of a stimulable phosphor sheet (or radiation image storage panel) with radiation having passed through an object or having been emitted by an object to record a radiation energy image of the object on the stimulable phosphor sheet:

sequentially exciting said surface of the stimulable phosphor sheet with stimulating rays to release the radiation energy recorded in the phosphor as stimulated emission;

photoelectrically detecting the stimulated emission from the excited surface and, optionally, from the opposite surface of the stimulable phosphor sheet to obtain electric signals;

reproducing the radiation image of the object as a visible image from the electric signals; and applying erasing light onto at least the front side surface of the already excited stimulable phosphor sheet to release radiation energy remaining in the phosphor sheet.

Thus, the stimulable phosphor sheet can be repeatedly employed.

In this method, a radiation image is obtainable with a sufficient amount of information by applying a radiation to the object at a considerably smaller dose, as compared with a conventional radiography using a combination of a radiographic film and radiographic intensifying screen.

The stimulable phosphor sheet has a basic structure comprising a support and a stimulable phosphor layer provided thereon. However, if the phosphor layer is self-supporting, the support may be omitted. On the free surface (surface not facing the support) of the phosphor layer, a transparent protective film is generally placed to keep the phosphor layer from chemical deterioration or physical shock.

The phosphor layer usually comprises a binder and stimulable phosphor particles dispersed therein, but it may consist of agglomerated phosphor without binder. The phosphor layer containing no binder can be formed by deposition process or firing process. Further, the layer comprising agglomerated phosphor soaked with a polymer is also known. In any type of phosphor layer, the stimulable phosphor emits stimulated emission when excited with stimulating rays after having been exposed to a radiation such as X-rays. Accordingly, the radiation having passed through an object or radiated from an object is absorbed, by the phosphor layer of the phosphor sheet in proportion to the applied radiation dose, and a radiation image of the object is produced in the phosphor sheet in the form of a radiation energy-stored image. The radiation energy-stored image can be released as stimulated emission by sequentially irradiating the phosphor sheet with stimulating rays. The stimulated emission is then photoelectrically detected to give electric signals, so as to reproduce a visible image from the electric signals.

The radiation image recorded in the phosphor sheet is generally read by the steps of applying stimulating rays onto the front surface side (phosphor layer side) of the phosphor sheet, collecting light emitted by the phosphor particles by means of a light-collecting means from the same side, and photoelectrically converting the light into image signals. A system for reading the image from one side of the phosphor sheet in this manner is referred to as "single-side reading system". However, there is a case that the light emitted by the phosphor particles should be collected from both sides (i.e., the front and the back surface sides) of the phosphor sheet. For instance, there is a case that the emitted light is wanted to be collected as much as possible. There is also a case that the radiation image recorded in the phosphor layer varies along the depth of the layer, and that the variation is wanted to be detected. A system for reading the image from both sides of the phosphor sheet is referred to as "double-side reading system". A stimulable phosphor sheet employed in the double-side reading system, as well as a phosphor sheet employed in the single-side reading system, is wanted to be as sensitive as possible and to provide an image of high quality (e.g., high sharpness, high resolution, high graininess, etc.).

For not only erasing a remaining radiation image but also removing other stored radiation energy given by environmental radiation or radioactive isotope contaminated in the phosphor sheet, the phosphor sheet for double-side reading system (as well as that for single-side reading system) is subjected to the aforementioned erasing step after the stored image is read out or before the next recording procedure. In this erasing step, light for erasing (hereinafter referred to as "erasing light") is applied onto the front surface or both of the front and the back surfaces of the phosphor sheet.

A radiation image remaining in the phosphor sheet for double-side reading system is more effectively erased by applying the erasing light onto both surfaces, as compared with applying the light onto one surface. Further, in that case, if the erasing light is applied onto the front surface more than onto the back surface, the erasing efficiency is much improved. However, the total amount of the erasing light is restricted by the employed reading apparatus, and hence if the amount of the erasing light applied onto the front surface side is increased, the amount of the light applied onto the back surface side is decreased. Accordingly, the radiation energy remaining on the back surface side is relatively increased. In consideration of this problem, a stimulable phosphor sheet (as well as an erasing system) giving excellent erasing efficiency is required.

The inventors studied about stimulable phosphors from various viewpoints, and found that improvement of the erasing property is generally incompatible with improving the stimulated emission property. Therefore, if the erasing property of the phosphor in a stimulable phosphor sheet is improved, the emission produced by stimulation is impaired, and consequently the radiation image given by the stimulable phosphor sheet is liable to have poor quality.

SUMMARY OF THE INVENTION

It is an object of the present invention to provide a stimulable phosphor sheet giving both improved erasing efficiency and a reproduced radiation image with high quality in a double-side reading system.

For solving the aforementioned incompatible problems (namely, for improving the erasing efficiency without impairing the image quality), the inventors have further studied and finally achieved the present invention.

The present invention resides in a stimulable phosphor sheet comprising a stimulable phosphor which is employed in a radiation image double-side reading system, in which radiation energy image erasability on a front side surface onto which stimulating rays are to be applied being lower than that on a back side surface in such manner that a ratio of a difference of an erasing value to a lower erasing value determined on the front side surface or on the back side surface is less than 10%; said erasing value being determined under the following conditions:

each surface of the stimulable phosphor sheet is submitted to an erasing procedure in which a ratio of an energy of erasing light applied to the front side surface and an energy of erasing light applied to the back side surface is adjusted to 6:4, 7:3, or 8:2; and the erasing value is calculated on each surface by dividing a quantity of stimulated emission after the erasing procedure by a quantity of stimulated emission before the erasing procedure.

The invention further resides in a radiation image recording and reproducing method which comprises the steps of:

irradiating one surface of the stimulable phosphor sheet of the invention with radiation having passed through an object or having been emitted by an object to record a radiation energy image of the object on the stimulable phosphor sheet;

sequentially exciting said surface of the stimulable phosphor sheet with stimulating rays to release the radiation energy recorded in the phosphor as stimulated emission;

photoelectrically detecting the stimulated emission from the excited surface and the opposite surface of the stimulable phosphor sheet to obtain electric signals;

reproducing the radiation image of the object as a visible image from the electric signals; and applying erasing light onto at least the front side surface of the already excited stimulable phosphor sheet to release radiation energy remaining in the phosphor sheet.

In the invention, at least two kinds of stimulable phosphors are preferably used. One of them has a good erasing property and another has a good emission property. In a part of the phosphor layer near the bottom surface (back surface side), a relatively large amount of the radiation energy is liable to remain after reading the recorded radiation image. Therefore, in the phosphor layer, the phosphor having a better erasing property (i.e., erasability) is incorporated more in a part near the bottom surface than in a part near the top surface. On the other hand, since the top surface (front surface side) of the phosphor layer is exposed to radiation and light for reading (i.e., stimulating rays), the phosphor having a better emission property is incorporated in a part near the top surface. Consequently, in the stimulable phosphor sheet of the invention, the difference between the erasability on the front and the back surface sides can be as small as possible. Accordingly, the stimulable phosphor sheet of the invention gives an improved erasing efficiency while it ensures high image quality. If the phosphor sheet of the invention is used, a lamp for erasing on the back surface side can be down-sized. Consequently, an erasing apparatus or a reading apparatus equipped with erasing means for a double-side reading system can be decreased in its volume.

In the present specification, the erasing values of the front and the back surface sides can be determined in the following manner. First, after the front surface of the phosphor sheet is exposed to radiation of X-rays, stimulating rays (i.e., light in the stimulating wave-length region for the stimulable phosphor contained in the phosphor sheet) are applied on the front surface. The stimulated emission is observed from both of the front and the back surface sides, to determine the amount of the emission (initial amount of the emission) from each side. Both surfaces are then exposed to the erasing light radiating from a fluorescent lamp so that the amounts of the light applied onto the front and the back surface sides may be in a ratio of 6:4, 7:3, or 8:2. After that, the light in the stimulating wavelength region is again applied on the front surface, and the emission is observed from both surface sides to determine the amount of the emission (amount of the emission after erasing) from each side. From the obtained amounts of the emission, the erasing value of each surface side is calculated in accordance with the following formula:

erasing value=(amount of the emission after erasing)/(initial amount of the emission).

The ratio (%) of the difference between the erasing values of the front and the back surface sides is obtained by dividing the difference with the smaller erasing value (which may be an erasing value on the front side surface or on the back side surface).

Here, the "front surface" means the surface onto which the stimulating rays for reading the recorded image are applied, and concretely is the top surface of the phosphor layer (if a protective film is provided on the phosphor layer, it means the surface of that protective film). The "back surface" means the bottom surface of the phosphor layer (if a transparent support is provided, it means the bottom surface of that support).

DETAILED DESCRIPTION OF THE INVENTION

The preferred embodiments of the invention are as follows.

(1) The stimulable phosphor sheet comprises a transparent support film, a stimulable phosphor layer, and a transparent protective film, the stimulating rays being applied onto the transparent protective film.

(2) The stimulable phosphor layer comprises two or more kinds of stimulable phosphors differing from each other in erasability, and a stimulable phosphor having a higher erasability is predominantly present on the back side surface.

(3) The stimulable phosphor layer comprises two or more stimulable phosphor sub-layers differing from each other in erasability and a stimulable phosphor sub-layer on the back side surface has a higher erasability.

(4) The stimulable phosphor layer consists essentially of two stimulable phosphor sub-layers.

(5) The stimulable phosphor is an europium activated alkaline earth metal halide phosphor.

(6) The stimulable phosphor sub-layer on the front side surface gives a stimulated emission higher than that given by the stimulable phosphor sub-layer on the back side.

(7) In the radiation image recording and reproducing method, the step of applying erasing light is applied on both of the front side surface and back side surface of the phosphor sheet by applying erasing lights at a ratio of an energy of erasing light applied to the front side surface and an energy of erasing light applied to the back side surface which is adjusted to 51:49 to 90:10.

The stimulable phosphor sheet of the invention for double-side reading system can be produced by the process described below. In the following description, the process for the phosphor sheet having a phosphor layer consisting of two or more sub-layers is described as an example.

The transparent support is usually a transparent plastic film (or sheet). Examples of the plastic materials include polyethylene terephthalate, polyethylene naphthalate, polyamide, polyimide, and aramid resin. However, the material for the support is not restricted to those examples, and a plastic material having enough strength and high transparency is preferably employed. The thickness of the support is generally in the range of 10 to 1,000 $\mu$m. If the stimulable phosphor layer is self-supporting, the support may be omitted. On the surface of the support film facing to the phosphor layer, an undercoating (adhesive) layer may be provided to increase the adhesion between the support film and the phosphor layer or to improve the image quality (sharpness, graininess). The undercoating layer may contain an antistatic agent and/or light-scattering fine particles dispersed therein.

On the support film, a stimulable phosphor layer consisting of two or more sub-layers is provided. The phosphor layer consists of at least two sub-layers, and the erasing property of the bottom sub-layer (back surface side of the phosphor sheet) is better than that of the top sub-layer (front surface side of the phosphor sheet). A typical phosphor layer or sub-layer comprises a binder resin and stimulable phosphor particles dispersed therein, and hence the phosphor sheet of the invention having that phosphor layer or sub-layer is explained below.

As the stimulable phosphor, a phosphor giving a stimulated emission of a wavelength in the range of 300 to 500 nm when it is irradiated with stimulating rays of a wavelength in the range of 400 to 900 nm is preferably employed. In Japanese Patent Provisional Publications No. 2(1990)-193100 and No. 4(1992)-310900, some examples of the stimulable phosphor are described in detail. Examples of the preferred stimulable phosphors include europium or cerium activated alkaline earth metal halide phosphors, and cerium activated oxyhalide phosphors. However, they are by no means given to restrict the stimulable phosphor employable in the invention, and any other phosphor can be also employed provided that it gives stimulated emission when excited with a stimulating ray after having been exposed to a radiation.

In the present invention, at least two kinds of stimulable phosphors having different erasing properties are used. Here "phosphors having different erasing properties" means phosphors giving different erasing values. Preferably, the phosphors employed in the invention include a phosphor having a better erasing property and a phosphor having an inferior erasing property but a higher emission property. The phosphors having different erasing and emission properties can be prepared by varying the firing conditions (e.g., firing atmosphere). Each sub-layer may be prepared from either one of thus-prepared phosphors or plural kinds of them in a proper mixing ratio. Thereby, the bottom sub-layer is formed so that it may contain a relatively large amount of the phosphor having a better erasing property but a slightly inferior emission property, and the top sub-layer is formed so that it may contain a relatively large amount of the phosphor having a better emission property but an inferior erasing property. Not only in the erasing and emission properties but also in other conditions (e.g., mean particle size, chemical components), the stimulable phosphors may differ from each other.

The multi-layered stimulable phosphor layer (consisting of two or more sub-layers) can be formed, for example, in the following manner.

First, two or more kinds of coating liquids dispersing stimulable phosphor particles are prepared. The stimulable phosphor particles and a binder are added into a solvent, and mixed well to prepare each coating liquid in which the phosphor particles are homogeneously dispersed in an organic solution of the binder.

Examples of the binders include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, linear polyester, and thermoplastic elastomers. These may be crosslinked using a crosslinking agent.

Examples of the solvents employable in the preparation of the coating liquid include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate, and butyl acetate; ethers such as dioxane, ethylene glycol monoethyl ether, ethylene glycol monomethyl ether and tetrahydrofuran; and mixtures of the above-mentioned compounds.

The ratio between the binder and the phosphor in the liquid depends on the characteristics of the phosphor and the aimed property of the phosphor sheet, but generally they are incorporated at a ratio of 1:1 to 1:100 (binder:phosphor, by weight), preferably 1:8 to 1:40 (by weight). The coating liquid may further contain various additives such as dispersing agent (for assisting the phosphor particles in dispersing), plasticizer (for increasing the bonding between the binder and the phosphor particles), anti-yellowing agent (for inhibiting yellowing of the phosphor layer), hardening agent and crosslinking agent.

Thus, at least two kinds of coating liquids each containing a binder and phosphor particles can be prepared. They are then evenly coated on the surface of a support film, and dried to form the sub-layers. The coating procedure can be performed using a conventional means such as a doctor blade, a roll coater, or a knife coater. The phosphor layer can be prepared by repeating the coating procedure with each coating liquid to form the sub-layers one by one successively, or by simultaneously applying the plural coating liquids by simultaneous superposition coating method to form the sub-layers at a time.

Alternatively, the phosphor layer may be prepared in the following manner. Each coating liquid is coated on a temporary support (e.g., a glass plate, a metal plate, a plastic sheet) and dried to form a phosphor sheet for each sub-layer, and then thus prepared phosphor sheets are superposed one after another and fixed on the permanent support by pressing or using an adhesive agent. In this case, a phosphor sheet placed near the support may be reversed and fixed on the support. In the resultant phosphor layer, the outer part (the part near the front or the back surface) contains a relatively large amount of the binder while the inner part contains a relatively small amount of the binder. The phosphor layer having that structure gives a radiation image of further improved quality.

Thus, the phosphor layer consisting of two or more sub-layers can be prepared on the support.

The phosphor layer may consist of two sub-layers [i.e., the upper (top) and the lower (bottom) sub-layers], or may consist of three or more sub-layers. If the sub-layers are formed using the same binder and/or solvent, the interfaces therebetween are not always clear. The thickness of each sub-layer may be determined according to various conditions (e.g., the characteristics of the aimed stimulable phosphor sheet, the nature of the phosphor employed, the mixing ratio between the binder and the phosphor), and generally is in the range of 20 $\mu$m to 1 mm (preferably 50 to 500 $\mu$m).

The phosphor layer usually comprises a binder and stimulable phosphor particles dispersed therein, but it may consist of agglomerated phosphor without binder. Further, the phosphor layer may comprise agglomerated phosphor soaked with a polymer.

A transparent protective film may be placed on the free surface (surface not facing the support) of the phosphor layer to keep the layer from chemical deterioration or physical damage. The protective film can be prepared by various method, for example, by coating the phosphor layer with a solution in which a transparent polymer material (e.g., cellulose derivatives, polymethyl methacrylate, organic solvent soluble-fluorocarbon resin) is dissolved in an appropriate solvent, by fixing a transparent resin film (e.g., a glass plate, a film of organic polymer such as polyethylene terephthalate) on the phosphor layer with adhesive, or by depositing an inorganic material on the phosphor layer. In the protective film, various additives (e.g., light-scattering fine particles such as magnesium oxide, zinc oxide, and titanium oxide; slipping agent such as perfluoroolefin resin powder and silicone resin powder; crosslinking agent such as polyisocyanate) may be incorporated. The thickness of the protective film is generally in the range of approx. 0.1 to 20 $\mu$m.

In the manner described above, the stimulable phosphor sheet of the invention can be prepared. The stimulable phosphor layer does not need to have the abovedescribed multi-layered structure, and it may be a single layer. In the single phosphor layer, a phosphor having a better erasing property is contained more in a part near the bottom surface than in a part near the top surface, and a phosphor having a better emission property (but an inferior erasing property) is contained more in a part near the top surface than in a part near the bottom surface The phosphor sheet of the invention may be modified in various known ways. For example, in order to improve the sharpness of a resultant image, at least one of the layers may be colored with a coloring agent which does not absorb stimulated emission but stimulating ray.

EXAMPLE 1

(1) Preparation of stimulable phosphors

Powders of BaFBr:Eu and BaFI:Eu were independently prepared. Each powder contained $5\times10^{-3}$ mol. of Eu activator, $1\times10^{-3}$ mol. of K additive, $1\times10^{-3}$ mol. of Cs additive, and $1\times10^{-3}$ mol of Ca additive, per 1 mol. of Ba. The powders were mixed so that the ratio of Br/I would be 85/15, and 1 wt. % of alumina fine particles were added so as to avoid sintering. The mixture was well mixed with a mixer, and 3 kg of the obtained mixture was placed in a quartz boat. In a firing furnace equipped with a quartz firing tube (in which firing atmosphere could be controlled), the boat was placed and fired at 850° C. for 2 hours under a gaseous atmosphere containing a small amount of oxygen. After the firing was complete, the boat was cooled to room temperature with the atmospheric gas evacuated by a vacuum pump. As a result, $BaFBr_{0.85}I_{0.15}:Eu^{2+}$ phosphor was prepared. The procedure was repeated except for varying the condition of the oxygen gas atmosphere, to prepare two kinds of tetradecahedral $BaFBr_{0.85}I_{0.15}:Eu^{2+}$ phosphors having different erasing properties. Further, the sizes of the powders were also changed to prepare two kinds of the phosphor particles having different mean particle sizes (the peaks of particle size distribution) of 6 $\mu$m and 3 $\mu$m. Consequently, four kinds of the phosphors were prepared.

EVALUATION OF STIMULABLE PHOSPHOR

The emission and erasing properties of each prepared stimulable phosphor were evaluated in the following manner.

(1) Emission Property (Amount of Stimulated Emission)

After exposed to X-rays (generated under 80 kVp), the phosphor particles were excited with a laser (wavelength: 660 nm) of 8 J/m². The stimulated emission was detected with a photomultiplier tube to measure the amount of the emission. The measured amount was reduced to a relative value.

(2) Erasing Property (Erasing Value)

The amount of the stimulated emission was measured in the above manner, to determine an initial amount of the emission. The phosphor particles were exposed to light radiating from a fluorescent lamp of incandescent color (three-wavelengths type) through an acrylic filter in the amount of 500,000 lx·s, and then excited again with the laser to determine the amount of the stimulated emission after the erasing procedure. The ratio of (the amount of the emission after erasing)/(the initial amount of the emission) was calculated to give the erasing value.

(3) Results

The results are set forth in Table 1. A smaller erasing value of phosphor means that the phosphor has a better erasing property.

TABLE 1

| | stimulated emission (relative value) | erasing value | mean particle size ($\mu$m) | |
|---|---|---|---|---|
| phosphor $a_1$ | 100 | $7.0 \times 10^{-5}$ | 6 | sub-layer A |
| phosphor $a_2$ | 90 | $6.0 \times 10^{-5}$ | 3 | |
| phosphor $b_1$ | 97 | $2.4 \times 10^{-5}$ | 6 | sub-layer B |
| phosphor $b_2$ | 88 | $2.5 \times 10^{-5}$ | 3 | |

(2) Preparation of phosphor sheet A

Phosphor: a mixture of Phosphor $a_1$ and Phosphor $a_2$ in the weight ratio of 7:3 200 g Binder: polyurethane elastomer (Pandex T-5265H (solid), Dai-nippon Ink & Chemicals, Inc.) 6.4 g Crosslinking agent: (polyisocyanate resin, Colonate HX (solid content: 100%), Nippon Polyurethane Co., Ltd.) 0.6 g Anti-yellowing agent: (epoxy resin, Epikote #1001 (solid), Yuka Shell Epoxy Kabushiki Kaisha) 3 g The above materials were added in methyl ethyl ketone, and mixed by means of a propeller mixer to prepare a coating liquid having the viscosity of 30 ps at 25° C. (binder/phosphor: 1/20, by weight). The prepared coating liquid was coated by a doctor blade on a temporary support (polyethylene terephthalate sheet having the surface beforehand coated with silicon releasing agent) of 180 $\mu$m thick, and dried to form a layer. The layer thus formed was then peeled from the temporary support to prepare a phosphor sheet A (thickness: 220 μm, width: 300 mm).

(3) Preparation of phosphor sheet B

The procedure of (2) was repeated except for using, as the phosphor, 200 g of a mixture of Phosphor $b_1$ and Phosphor $b_2$ in the weight ratio of 7:3, to prepare a phosphor sheet B (thickness: 220 μm, width: 300 mm).

(4) Preparation of stimulable phosphor layer

A polyethylene terephthalate sheet (thickness: 250 μm, degree of haze: 20; Lumilar S-10, Toray Industries, Inc.) was prepared. On one surface of the sheet, an unsaturated polyester resin solution (a mixture of Byron 300 and Byron 200 in a weight ratio of 7:3, Toyobo Co., Ltd.) was coated and dried to from a transparent adhesive layer (thickness: 15 μm). On the adhesive layer, the above-prepared stimulable phosphor sheet B was placed so that the front surface, which had not been in contact with the temporary support in the procedure (3), would become in contact with the adhesive layer. Thus-prepared layered composition was then pressed with heating by means of a calender roll (metal rolls, roll diameter: 200 mm, total weight: 1.6 t, temperature of the upper roll: 45° C., temperature of the lower roll: 45° C., transferring rate: 0.3 m/minute), so that the pressed phosphor sheet B might be provided on the adhesive layer.

On the pressed phosphor sheet B thus provided, the phosphor sheet A was placed so that the back surface, which had been in contact with the temporary support in the procedure (2), would become in contact with the pressed phosphor sheet B. Thus-prepared composition was then pressed under heating by means of a calender roll (total weight: 2.5 t, temperature of the upper roll: 45° C., temperature of the lower roll: 45° C., transferring rate: 0.3 m/minute), so that a stimulable phosphor layer consisting of the phosphor sheets B and A (total thickness: 320 μm) might be completely fixed on the support (polyethylene terephthalate sheet) via the adhesive layer.

(5) Preparation of transparent protective film

On the stimulable phosphor layer, a polyethylene terephthalate film (thickness: 6 μm) provided with a polyester adhesive layer (thickness: 1.5 μm) on one side surface was overlaid so that the adhesive layer would become in contact with the phosphor layer. Thus-prepared layered composition was then pressed under heating by means of a heating roll at 90 to 100° C., to fix the film on the phosphor layer. The layered composition was further heated and pressed using an embossing roll so that the surface roughness (Ra) might be in the range of 0.1 to 0.4 μm.

Fluorocarbon resin: fluoroolefin-vinyl ether copolymer
(Lumiflon LF-504X [30% xylene solution], Asahi Glass Co., Ltd.) 92 g Crosslinking agent: polyisocyanate
(Sumijule N3500 [solid content: 100%], Sumitomo Bayern Urethane, Inc.) 5 g Slipping agent: silicone modified with alcohol
(X-22-2809 [66% xylene-containing paste], The Shin-Etsu Chemical Co., Ltd.) 0.5 g Light-scattering fine particles: melamine-formaldehyde filler
(Epostar S6, Nippon Shokubai Co., Ltd.) 6.5 g Coupling agent: acetoalcoxyaluminum diisopropylate
(Plane-act Al-M, Ajinomoto Co., Inc.) 0.1 g Catalyst: dibutyl tin dilaurate
(KS1260, Kyodo Yakuhin Co., Ltd.) 0.35 mg The above materials were mixed to prepare a fluorocarbon resin coating liquid, and the liquid was coated by a doctor blade on the polyethylene terephthalate film provided on the phosphor layer. The applied liquid was heated to harden and dry at 120° C. for 20 minutes, to form a resin layer (thickness: 1.5 μm). Thus, a protective film consisting of the polyethylene terephthalate film and the resin layer was provided on the phosphor layer.

Thus, a stimulable phosphor sheet of the invention comprising a transparent support, a stimulable phosphor layer consisting of the sheets (sub-layers) B and A, and a polyethylene terephthalate protective film and the resin layer was prepared.

Comparison Example 1

The procedures of Example 1 were repeated except that the phosphor sheet A was used in place of the phosphor sheet B in the step (4) to form a stimulable phosphor layer (total thickness: 320 μm) consisting of the sheets (sub-layers) A and A, to prepare a stimulable phosphor sheet for comparison.

Comparison Example 2

The procedures of Example 1 were repeated except that the phosphor sheet B was used in place of the phosphor sheet A in the step (4) to form a stimulable phosphor layer (total thickness: 320 μm) consisting of the sheets (sub-layers) B and B, to prepare a stimulable phosphor sheet for comparison.

Evaluation of Stimulable phosphor sheet

With respect to each prepared phosphor sheet, the erasing property of each surface side and the image quality were evaluated.

(1) Erasing Property

After the front surface (the surface of the protective film) of the sample phosphor sheet was exposed to X-rays (generated under 80 kVp), a light (wavelength: 660 nm) radiating from a laser was applied onto the front surface in an amount of 8 J/. In a scanner for double-side reading, the stimulated emission was detected from both sides with photomultiplier tubes to measure the initial amount of the emission from each side. Both surfaces of the phosphor sheet were then exposed to a light (erasing light) radiating from a fluorescent lamp of incandescent color (three-wavelengths type) through an acrylic (clear or yellow) filter in an apparatus for double-side erasing. In the apparatus, the surfaces were exposed to the light through the acrylic clear filter first, and then successively exposed to the light through the yellow filter (the ratio between the lengths of the clear and the yellow filters was set at 3:2). The total amount of the erasing light was 500,000 lx·s, and the ratio of the amounts of the erasing light applied onto the front and the back surface sides was set at 6:4. After the erasing procedure was complete, the stimulated emission was again measured in the scanner for double-side reading, to obtain the amount of the emission from each side. With respect to each sides, the ratio of (amount of the emission after erasing)/(initial amount of the emission) was calculated to obtain the desired erasing value. The ratio (%) of the difference between the erasing values of the front and the back surface sides was calculated by dividing the difference with the smaller value. The results are set forth in Table 2.

(2) Image Quality

After the sample phosphor sheet was exposed to X-rays (generated under 80 kVp) through an MTF chart, the stimulable phosphor in the phosphor sheet was excited with a laser (wavelength: 660 nm). The stimulated emission was detected from both sides of the phosphor sheet with photomultiplier tubes (S-5), and converted into electric signals. The electric signals thus obtained from both sides were accumulated to obtain image signals. The signals were subjected to the operation process, and then the image was reproduced and recorded on a silver halide photographic film by means of a film scanner.

The obtained image was examined by visual observation. According to the observation, the sharpness and the graininess of the image given by each phosphor sheet were evaluated and classified according to the following criteria based on those of Comparison Example 1:

+2: Excellent
+1: Good
0: Standard (Comparison Example 1)
−1: Poor
−2: Very Poor.

The results are set forth in Table 2.

TABLE 2

|  | Ex. 1 | Com. Ex. 1 | Com. Ex. 2 |
|---|---|---|---|
| Structure |  |  |  |
| upper sub-layer | A | A | B |
| lower sub-layer | B | A | B |
| Erasing Value |  |  |  |
| front surface | $6.4 \times 10^{-5}$ | $7.5 \times 10^{-5}$ | $4.9 \times 10^{-5}$ |
| back surface | $6.3 \times 10^{-5}$ | $9.0 \times 10^{-5}$ | $5.7 \times 10^{-5}$ |
| difference | 1.6% | 20% | 16% |
| Image Quality |  |  |  |
| sharpness | 0 | 0 | −1 |
| graininess | 0 | 0 | −2 |

The results in Table 2 indicate the following. The phosphor sheet of the invention [i.e. phosphor sheet of Example 1, which comprises a phosphor layer consisting of the upper sub-layer A (on the front surface side) mainly containing a phosphor having a better emission property and the lower sub-layer B (on the back surface side) mainly containing a phosphor having a better erasing property] gives low erasing values on both surface sides. Further, it gives a very low difference (1.6%) of the erasing values. These facts mean that the phosphor sheet of the invention has a good erasing property. In addition, the image quality given by the phosphor sheet of the invention is as good as that given by the conventional phosphor sheet (Comparison Example 1). On the other hand, the phosphor sheet for comparison (Comparison Example 2) gives low erasing values on both surface sides, but impairs the image quality.

What is claimed is:

1. In a stimulable phosphor sheet comprising a stimulable phosphor which is employed in a radiation image double-side reading system, radiation energy image erasability on a front side surface onto which stimulating rays are to be applied being lower than that on a back side surface in such manner that a ratio of a difference of an erasing value to a lower erasing value determined on the front side surface or on the back side surface is less than 10%; said erasing value being determined under the following conditions:

each surface of the stimulable phosphor sheet is submitted to an erasing procedure in which a ratio of an energy of erasing light applied to the front side surface and an energy of erasing light applied to the back side surface is adjusted to 6:4, 7:3, or 8:2; and the erasing value is calculated on each surface by dividing a quantity of stimulated emission after the erasing procedure by a quantity of stimulated emission before the erasing procedure.

2. The stimulable phosphor sheet of claim 1, wherein the stimulable phosphor sheet comprises a transparent support film, a stimulable phosphor layer, and a transparent protective film, the stimulating rays being applied onto the transparent protective film.

3. The stimulable phosphor sheet of claim 2, wherein the stimulable phosphor layer comprises two or more kinds of stimulable phosphors differing from each other in erasability, and a stimulable phosphor having a higher erasability is predominantly present on the back side surface.

4. The stimulable phosphor sheet of claim 2, wherein the stimulable phosphor layer comprises two or more stimulable phosphor sub-layers differing from each other in erasability and a stimulable phosphor sub-layer on the back side surface has a higher erasability.

5. The stimulable phosphor sheet of claim 4, wherein the stimulable phosphor layer consists essentially of two stimulable phosphor sub-layers.

6. The stimulable phosphor sheet of claim 1, wherein the stimulable phosphor is an europium activated alkaline earth metal halide phosphor.

7. The stimulable phosphor sheet of claim 4, wherein a stimulable phosphor sub-layer on the front side surface gives a stimulated emission higher than that given by the stimulable phosphor sub-layer on the back side.

8. A radiation image recording and reproducing method which comprises the steps of:

irradiating one surface of a stimulable phosphor sheet with radiation having passed through an object or having been emitted by an object to record a radiation energy image of the object on the stimulable phosphor sheet, in said stimulable phosphor sheet, radiation energy image erasability on a front side surface onto which stimulating rays are to be applied being lower than that on a back side surface in such manner that a ratio of a difference of an erasing value to a lower erasing value determined on the front side surface or on the back side surface is less than 10%; said erasing value being determined under the following conditions:

each surface of the stimulable phosphor sheet is submitted to an erasing procedure in which a ratio of an energy of erasing light applied to the front side surface and an energy of erasing light applied to the back side surface is adjusted to 6:4, 7:3, or 8:2; and the erasing value is calculated on each surface by dividing a quantity of stimulated emission after the erasing procedure by a quantity of stimulated emission before the erasing procedure;

sequentially exciting said surface of the stimulable phosphor sheet with stimulating rays to release the radiation energy recorded in the phosphor as stimulated emission;

photoelectrically detecting the stimulated emission from the excited surface and the opposite surface of the stimulable phosphor sheet to obtain electric signals;

reproducing the radiation image of the object as a visible image from the electric signals; and applying erasing light onto at least the front side surface of the already excited stimulable phosphor sheet to release radiation energy remaining in the phosphor sheet.

9. The radiation image recording and reproducing method of claim 8, wherein the step of applying erasing light is applied on both of the front side surface and back side surface of the phosphor sheet by applying erasing lights at a ratio of an energy of erasing light applied to the front side surface and an energy of erasing light applied to the back side surface which is adjusted to 51:49 to 90:10.

* * * * *